United States Patent
Ouyang

(10) Patent No.: US 10,264,615 B1
(45) Date of Patent: Apr. 16, 2019

(54) VEHICLE-MOUNTED DEVICE AND SECURE COMMUNICATION METHOD

(71) Applicant: HON HAI PRECISION INDUSTRY CO., LTD., New Taipei (TW)

(72) Inventor: Liang-Yuan Ouyang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/859,770

(22) Filed: Jan. 2, 2018

(30) Foreign Application Priority Data

Dec. 22, 2017 (CN) .......................... 2017 1 1401911

(51) Int. Cl.
*H04W 76/14* (2018.01)
*H04W 4/48* (2018.01)

(52) U.S. Cl.
CPC ............ *H04W 76/14* (2018.02); *H04W 4/48* (2018.02)

(58) Field of Classification Search
CPC .............................. H04M 1/6091; H04W 4/80
See application file for complete search history.

(56) References Cited

U.S. PATENT DOCUMENTS

| 8,933,782 | B2 * | 1/2015 | Pierfelice | ................ | H04L 63/10 |
| | | | | | 340/5.83 |
| 9,272,713 | B1 * | 3/2016 | Dvoskin | ................ | B60W 40/08 |
| 2011/0093161 | A1 * | 4/2011 | Zhou | ................... | B60W 50/08 |
| | | | | | 701/31.4 |
| 2011/0321156 | A1 * | 12/2011 | Smith | .................... | G06F 21/31 |
| | | | | | 726/19 |
| 2016/0035001 | A1 * | 2/2016 | Driscoll | ............ | G06Q 30/0631 |
| | | | | | 705/26.7 |

FOREIGN PATENT DOCUMENTS

CN          101708707 B        9/2012

* cited by examiner

*Primary Examiner* — Hsinchun Liao
(74) *Attorney, Agent, or Firm* — ScienBiziP, P.C.

(57) ABSTRACT

A secure communication method between a vehicle-mounted diagnostic device and a mobile terminal of a user includes the device broadcasting a paging message, inviting at least one mobile terminal to send a pairing request to the vehicle-mounted device. In response to a pairing request from a mobile terminal, an inquiry signal is sent to the mobile terminal inquiring as to a pairing mode required. One of several pairing modes can be selected, each pairing mode corresponding to a preset pairing password and at least one vehicle-mounted system accessible under the pairing mode. Upon matching the pairing password from the mobile terminal with a device-stored preset pairing password corresponding to the selected pairing mode, a wireless connection between the vehicle-mounted device and the mobile terminal is made, allowing the mobile terminal to access the at least one vehicle-mounted system accessible under the selected pairing mode.

6 Claims, 3 Drawing Sheets

VEHICLE-MOUNTED DEVICE AND SECURE COMMUNICATION METHOD

FIELD

The subject matter relates to a vehicle-mounted device and a secure communication method performed by the vehicle-mounted device.

BACKGROUND

When fault occurs in a vehicle, an electronic control unit (ECU) mounted on the vehicle can deal with the faulty component to record fault information (such as in form of a fault code). For repairing the vehicle, the repair worker disassembles inner components of the vehicle, connects an external diagnosing apparatus to a data link connector of the vehicle through a controller area network (CAN) cable, and reads fault codes collected by the ECU. Thus, the repair worker can easily confirm or recognize details of the failure.

Although the above repairing method can protect user's privacy, disassembly of the inner components may be time-costly, and may cause damage to the vehicle. Improvements in the art are preferred.

BRIEF DESCRIPTION OF THE DRAWINGS

Implementations of the present technology will now be described, by way of example only, with reference to the attached figures.

DETAILED DESCRIPTION

Figure 1:
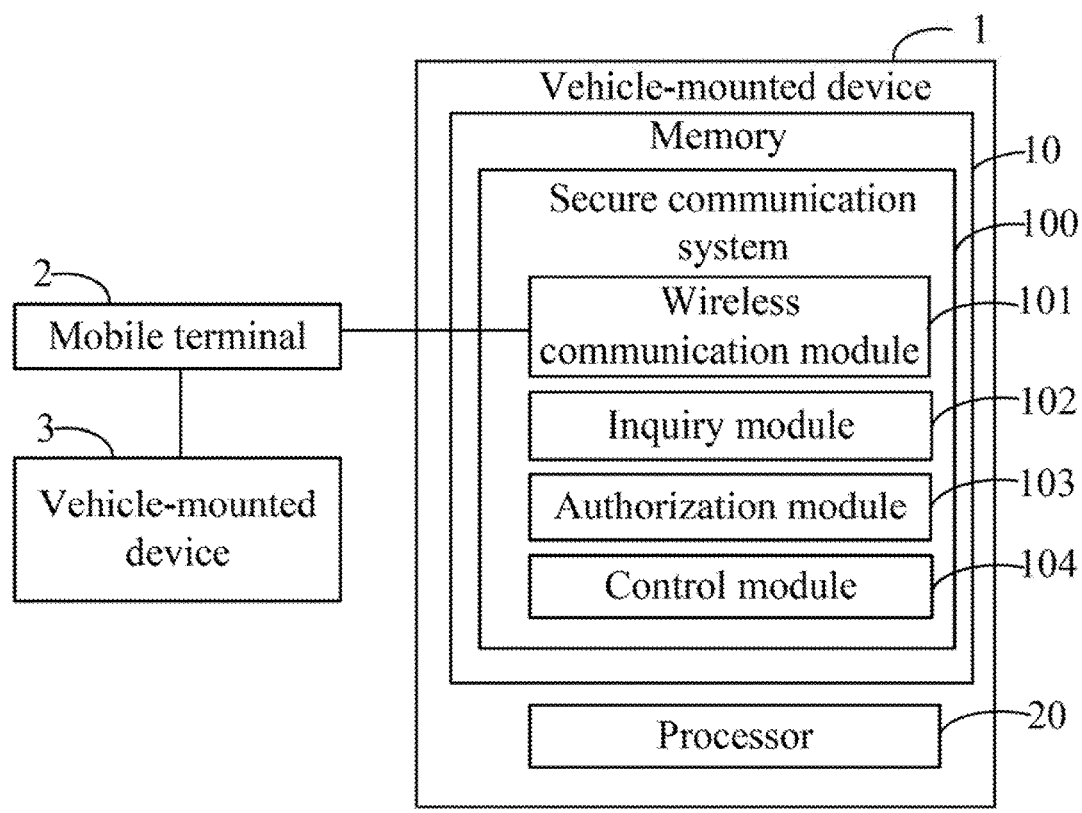
FIG. 1 is a block diagram of a vehicle-mounted device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In general, the word "module," as used hereinafter, refers to logic embodied in hardware or firmware, or to a collection of software instructions, written in a programming language, such as, for example, JAVA, C, or assembly. One or more software instructions in the modules may be embedded in firmware. It will be appreciated that modules may comprise connected logic modules, such as gates and flip-flops, and may comprise programmable modules, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series, and the like.

FIG. 1 illustrates an exemplary embodiment of a vehicle-mounted device 1. The vehicle-mounted device 1 can wirelessly communicate with a mobile terminal 2. The vehicle-mounted device 1 is in a vehicle (not shown). The vehicle-mounted device 1 can further communicate with a vehicle-mounted computer 3 of the vehicle. The mobile terminal 2 can be, but is not limited to, a tablet computer, a smart phone, and a multimedia player.

The vehicle-mounted computer 3 comprises at least one vehicle-mounted system, such as a vehicle-mounted information system and a vehicle-mounted multimedia system. The vehicle-mounted information display system comprises, but is not limited to, dashboard, intelligent transportation system, global positioning system (GPS), and fault diagnosis system. The vehicle-mounted multimedia system comprises, but is not limited to, stereo equipment and display screen.

The vehicle-mounted device 1 comprises a memory 10 and at least one processor 20. The memory 10 can be an internal storage system of the vehicle-mounted device 1 such as a flash memory, a random access memory (RAM) for temporary storage of information, and/or a read-only memory (ROM) for permanent storage of information. The memory 10 can also be an external storage system, such as a hard disk, a storage card, or a data storage medium. The memory 10 can also embedded in the processor 20. For example, the memory 10 is a register or a buffer of the processor 20. The memory 10 stores a secure communication system 100. The processor 20 can be a central processing unit (CPU), a microprocessor, or other data processor chip that performs functions of the system 100.

The vehicle-mounted device system 100 comprises a number of modules, which are a collection of software instructions which can be executed by the processor 20 to perform the function of the system 100. The modules of the system 100 can also be a collection of software instructions which are embedded in the processor 20, for example, the modules of the system 100 can be stored in the register or the buffer of the processor 20.

In at least one exemplary embodiment, the system 100 comprises a wireless communication module 101, an inquiry module 102, an authorization module 103, and a controlling module 104. A detailed description of each module will be given in the following paragraphs.

Figure 2:
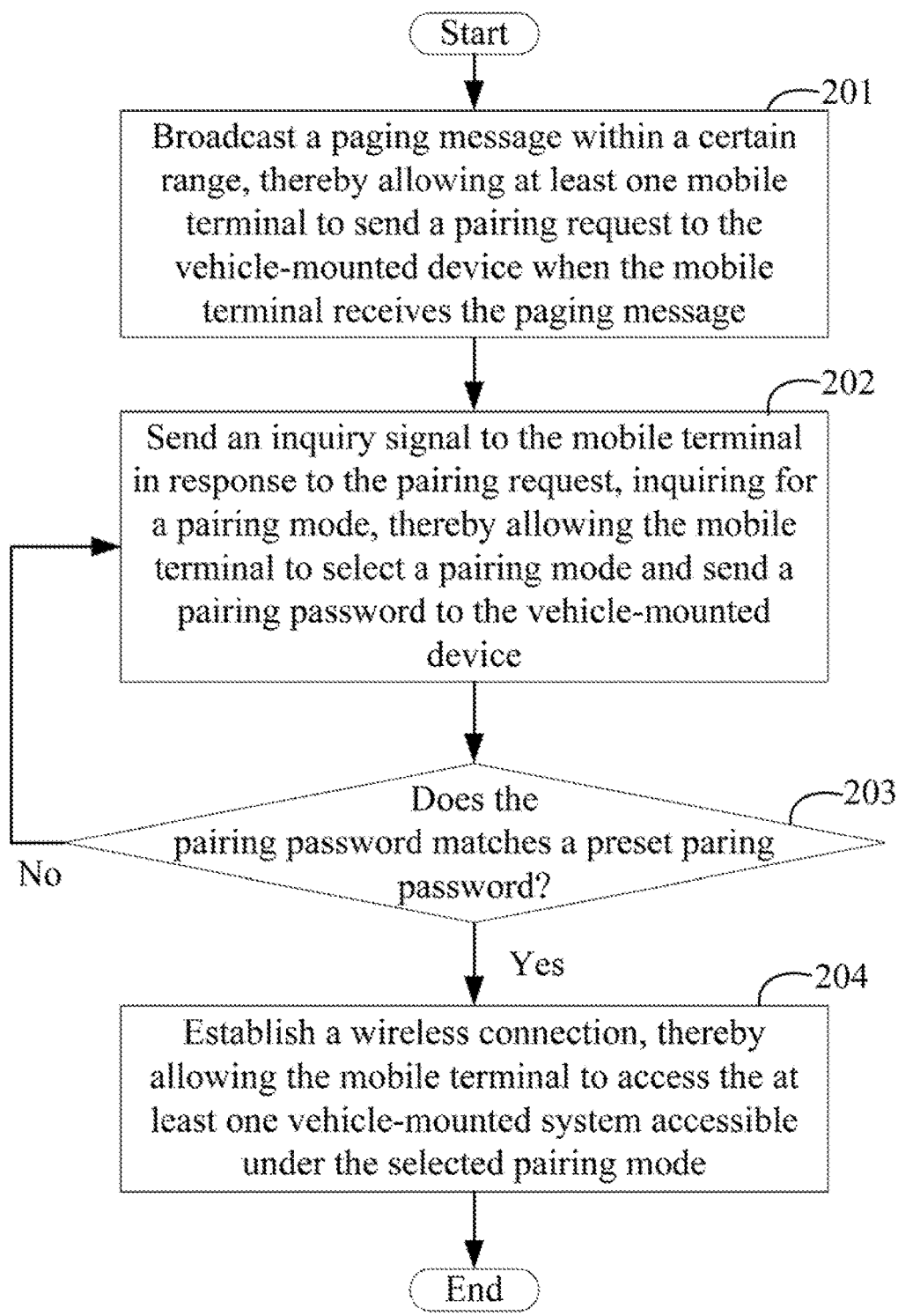
FIG. 2 is a flowchart of an exemplary embodiment of a secure communication method.

FIG. 2 illustrates an exemplary embodiment of a secure communication method. The method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 201.

At block 201, the wireless communication module 101 broadcasts a paging message within a certain range when the vehicle-mounted device 1 enters a paging state. Thus, when at least one mobile terminal 2 having wireless communication function receives the paging message, the mobile terminal 2 can send a pairing request to the vehicle-mounted device 1.

In at least one exemplary embodiment, the wireless communication module 101 is an LTE-Direct communication module.

At block 202, the inquiry module 102 sends an inquiry signal to the mobile terminal 2 in response to the pairing request, inquiring for a pairing mode. This allows the mobile terminal 2 to select a pairing mode according to need, and the mobile terminal 2 sends the pairing password to the vehicle-mounted device 1.

In at least one exemplary embodiment, the pairing mode is one of a driver mode, a repair factory mode, and a passenger mode. Each pairing mode corresponds to a preset pairing password and at least one vehicle-mounted system accessible under the pairing mode. The relationship among pairing modes, preset pairing passwords, and accessible vehicle-mounted systems is stored in the memory 10.

Figure 3:
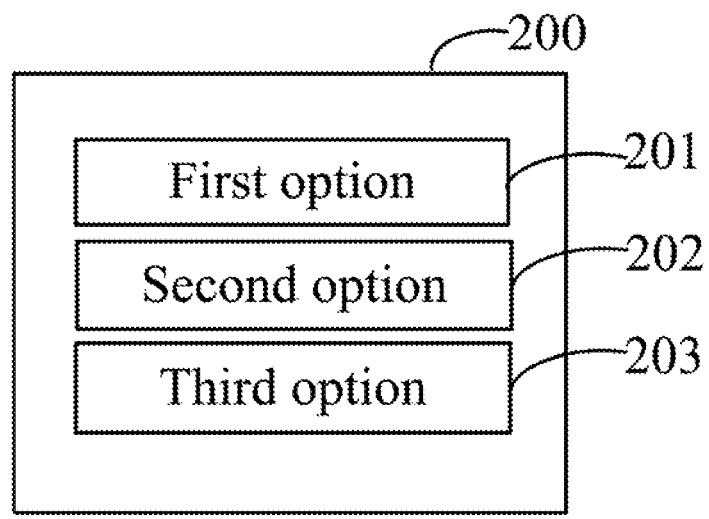
FIG. 3 is a diagram of a user input interface in the method of FIG. 2.

Referring to FIG. 3, in at least one exemplary embodiment, the inquiry signal controls the mobile terminal 2 to display a user input interface 200. The user input interface 200 displays a first option 201, a second option 202, and a third option 203, which respectively correspond to the driver mode, the repair factory mode, and the passenger mode. When the user selects one of the first option 201, the second option 202, and the third option 203, the corresponding pairing mode is selected.

At block 203, the authorization module 103 determines, according to the stored relationship, whether the pairing password from the mobile terminal 2 matches the preset pairing password corresponding to the selected pairing mode. If yes, the procedure goes to block 204; otherwise, block 202 is repeated.

At block 204, the controlling module 104 establishes a wireless connection between the vehicle-mounted device 1 and the mobile terminal 2 (for example, an LTE-Direct connection), thereby allowing the mobile terminal 2 to access the at least one vehicle-mounted system accessible under the selected pairing mode through the vehicle-mounted device 1.

In detail, when the user of the mobile terminal 2 is the driver, the driver can select the driver mode through the mobile terminal 2. The preset pairing password corresponding to the driver mode comprises a password set by the driver. The at least one vehicle-mounted system accessible under the driver mode comprises the vehicle-mounted information system and the vehicle-mounted multimedia system. That is, the driver can access the vehicle-mounted information system and the vehicle-mounted multimedia system, thereby obtaining information as to the state of the vehicle, and can upload files to and download files from the vehicle-mounted multimedia system.

When the user of the mobile terminal 2 is a repair worker, the repair worker can select the repair factory mode through the mobile terminal 2. The preset pairing password corresponding to the repair factory mode comprises a factory password and a password authorized by the driver. The at least one vehicle-mounted system accessible under the repair factory mode only comprises the vehicle-mounted information system. That is, the repair worker can access the vehicle-mounted information system through a controller area network (CAN) cable to read fault information, for repairing the vehicle.

When the user of the mobile terminal 2 is a passenger, the passenger can select the passenger mode through the mobile terminal 2. The preset pairing password corresponding to the driver mode comprises a password allocated to the passenger. The at least one vehicle-mounted system accessible under the passenger mode only comprises the vehicle-mounted multimedia system. That is, the passenger can access the vehicle-mounted multimedia system for entertainment purpose.

With the above configuration, the vehicle-mounted device 1 makes enquiry in advance as to the pairing mode required by the mobile terminal 2, and establishes the wireless connection between the vehicle-mounted device 1 and the mobile terminal 2 only when a pairing password from the mobile terminal 2 matches the preset pairing password corresponding to the pairing mode. Since different pairing modes have different accessible vehicle-mounted systems, the communication security between the vehicle-mounted device 1 and the mobile terminal 2 is ensured. Furthermore, disassembly of the inner components and connections of the external diagnosing apparatus and CAN cable can be avoided, thereby decreasing the repair time and avoiding damage to the vehicle.

Even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A vehicle-mounted device capable of communicating with at least one vehicle-mounted system, the vehicle-mounted device comprising:
at least one processor; and
a memory coupled to the at least one processor and storing one or more programs, wherein when executed by the at least one processor, the one or more programs cause the at least one processor to:
broadcast a paging message within a certain range, thereby allowing at least one mobile terminal to send a pairing request to the vehicle-mounted device when the mobile terminal receives the paging message;
send an inquiry signal to the mobile terminal in response to the pairing request, inquiring for a pairing mode, thereby allowing the mobile terminal to select a pairing mode and send a pairing password to the vehicle-mounted device, wherein each pairing mode corresponds to a preset pairing password and at least one vehicle-mounted system accessible under the pairing mode, the pairing mode is one of a driver mode, a repair factory mode, and a passenger mode, the at least one vehicle-mounted system accessible under the driver mode comprises a vehicle-mounted information system and a vehicle-mounted multimedia system, the at least one vehicle-mounted system accessible under the repair factory mode only comprises the vehicle-mounted information system, and the at least one vehicle-mounted system accessible under the passenger mode only comprises the vehicle-mounted multimedia system, the inquiry signal controls the mobile terminal to display a user input interface, the user input interface displays a first option, a second option, and a third option, which respectively correspond to the driver mode, the repair factory mode, and the passenger mode;

determine whether the pairing password from the mobile terminal matches the preset pairing password corresponding to the selected pairing mode; and establish a wireless connection between the vehicle-mounted device and the mobile terminal when the pairing password from the mobile terminal matches the preset pairing password, thereby allowing the mobile terminal to access the at least one vehicle-mounted system accessible under the selected pairing mode through the vehicle-mounted device.

2. The vehicle-mounted device of claim 1, wherein the wireless connection is an LTE-Direct connection.

3. The vehicle-mounted device of claim 1, wherein the preset pairing password corresponding to the driver mode comprises a password set by driver, the preset pairing password corresponding to the repair factory mode comprises a factory password and a password authorized by the driver, and the preset pairing password corresponding to the driver mode comprises a password allocated to passenger.

4. A secure communication method applied in a vehicle-mounted device which is capable of communicating with at least one vehicle-mounted system, the secure communication method comprising:

broadcasting a paging message within a certain range, thereby allowing at least one mobile terminal to send a pairing request to the vehicle-mounted device when the mobile terminal receives the paging message;

sending an inquiry signal to the mobile terminal in response to the pairing request, inquiring for a pairing mode, thereby allowing the mobile terminal to select a pairing mode and send a pairing password to the vehicle-mounted device, wherein each pairing mode corresponds to a preset pairing password and at least one vehicle-mounted system accessible under the pairing mode, the pairing mode is one of a driver mode, a repair factory mode, and a passenger mode, the at least one vehicle-mounted system accessible under the driver mode comprises a vehicle-mounted information system and a vehicle-mounted multimedia system, the at least one vehicle-mounted system accessible under the repair factory mode only comprises the vehicle-mounted information system, and the at least one vehicle-mounted system accessible under the passenger mode only comprises the vehicle-mounted multimedia system, the inquiry signal controls the mobile terminal to display a user input interface, the user input interface displays a first option, a second option, and a third option, which respectively correspond to the driver mode, the repair factory mode, and the passenger mode;

determining whether the pairing password from the mobile terminal matches the preset pairing password corresponding to the selected pairing mode; and establishing a wireless connection between the vehicle-mounted device and the mobile terminal when the pairing password from the mobile terminal matches the preset pairing password, thereby allowing the mobile terminal to access the at least one vehicle-mounted system accessible under the selected pairing mode through the vehicle-mounted device.

5. The secure communication method of claim 4, wherein the wireless connection is an LTE-Direct connection.

6. The secure communication method of claim 4, wherein the preset pairing password corresponding to the driver mode comprises a password set by driver, the preset pairing password corresponding to the repair factory mode comprises a factory password and a password authorized by the driver, and the preset pairing password corresponding to the driver mode comprises a password allocated to passenger.

* * * * *